(No Model.) 2 Sheets—Sheet 2.

S. GREEN.
TEMPERATURE CONTROLLING APPARATUS.

No. 578,984. Patented Mar. 16, 1897.

WITNESSES:

INVENTOR.
Sidney Green,
BY
ATTORNEY.

UNITED STATES PATENT OFFICE.

SIDNEY GREEN, OF NEW YORK, N. Y.

TEMPERATURE-CONTROLLING APPARATUS.

SPECIFICATION forming part of Letters Patent No. 578,984, dated March 16, 1897.

Application filed June 16, 1896. Serial No. 595,745. (No model.)

*To all whom it may concern:*

Be it known that I, SIDNEY GREEN, a citizen of the United States, and a resident of New York, in the county of New York and State of New York, have invented certain new and useful Improvements in Temperature-Controlling Apparatus, of which the following is a specification.

My invention relates to thermostatic regulation of temperature of rooms, buildings, &c., and particularly to heating by air-ventilation.

The object is to produce a conduit-valve-operating apparatus electrically controlled and constructed in such manner as to insure prompt and certain operation and having sufficient power to move the valve under all circumstances and having simplicity and cheapness of construction.

The novel features of my invention are hereinafter pointed out in the appended claim.

Figure 1:
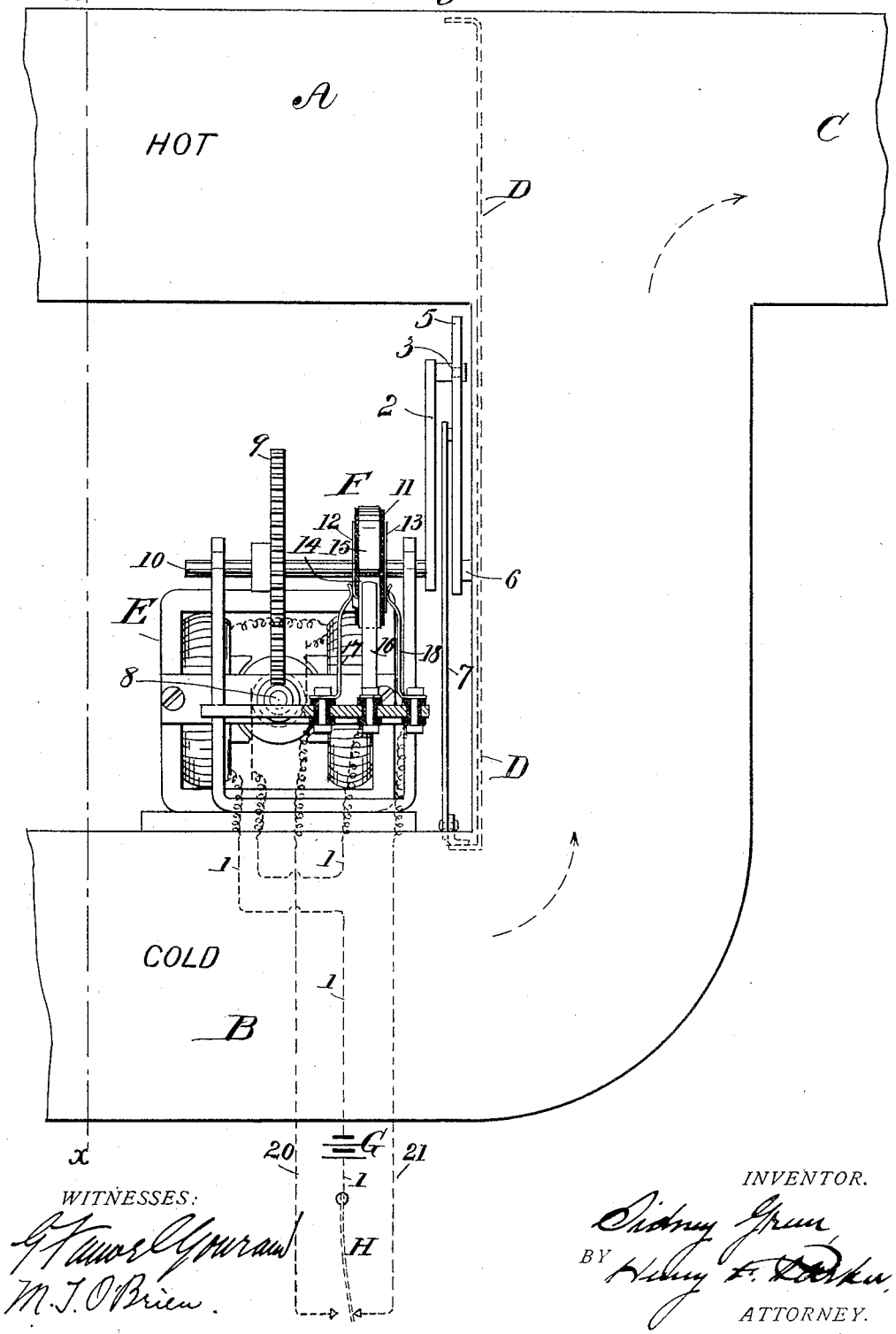
Figure 2:
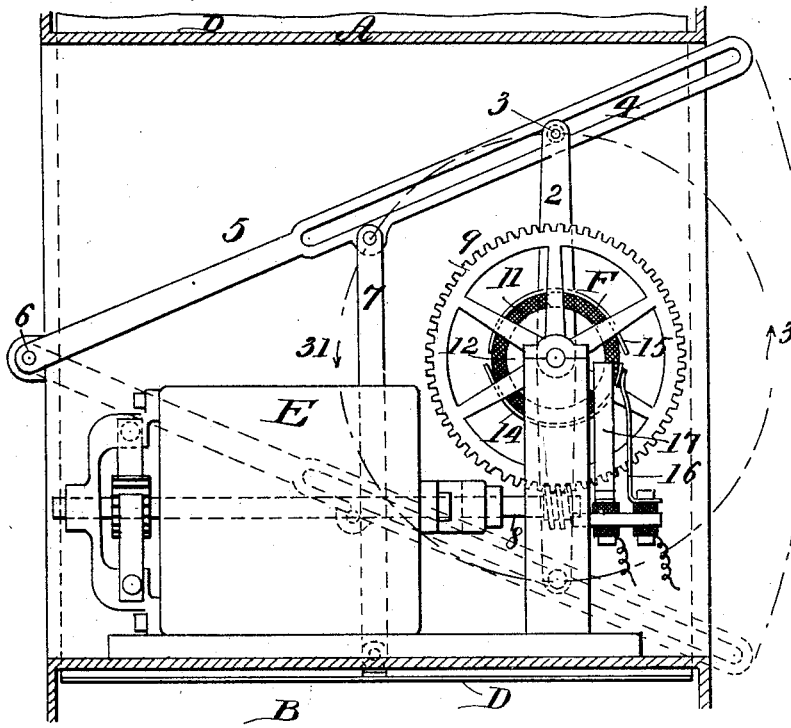
Figure 3:
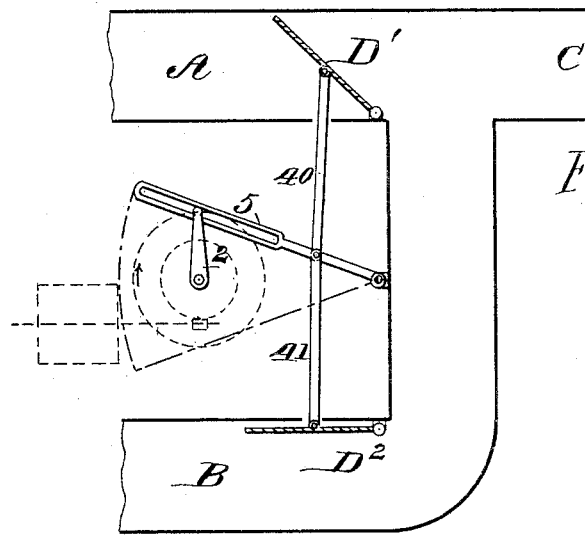

Referring to the accompanying drawings, in which like letters and figures of reference indicate like parts throughout the several views, Figure 1 is a side elevation showing a three-way-conduit regulator. Fig. 2 is a cross-section of Fig. 1, taken on the line $x\ x$. Fig. 3 is a sectional elevation showing a modification.

A represents a conduit leading from a source of hot air supplied from steam-radiating coils or otherwise located in the basement of a building or elsewhere.

B represents a conduit leading from a source of cold air, with suitable means of forcing or inducing a current.

C represents a conduit leading to an apartment or elsewhere in a building either directly or through the medium of a suitable mixing-chamber, where the alternate hot and cold inductions of air caused by the regulator are intermingled before entering the apartment.

D represents the valve, which is of the sluice type and controls both conduits A B alternately by its respective ends.

E is an electric motor for operating the valve D, and the motor is thrown in circuit 1 automatically by a rotary switch F, which is so constructed as to interrupt or break the circuit at half-revolutions of the crank 2. The crank 2 engages with its pin 3 in the slot 4 of a vibrating arm 5, pivoted at 6, and which is connected to the valve D by a connecting-rod 7. The crank 2 is shown at a point of stoppage at which the valve D closes the hot-air inlet A and opens the cold-air inlet B. The opposite point of stoppage of the crank 2 on its half-revolution will reverse the position of the valve D, closing the cold-air inlet B and opening the hot-air inlet A full open, there being no intermediate points of stoppage.

The shaft 8 of the motor E is worm-geared to the gear-wheel 9, mounted on the shaft 10, carrying the switch F, and therefore acquires great power mechanically for a small and economical size of motor, forcing the valve to operate under all conditions, as, for instance, when clogged or obstructed by rust or disuse or from crude construction. Accurate and expensive mechanical construction is avoided.

The switch F is composed of a disk of insulating material 11, having conducting-plates 12 13, connecting electrically to strips 14 15, respectively, which strips are insulated from one another and come into contact alternately with the contact-spring 16, which is connected to one pole of the circuit 1. The plates 12 13 have permanent contact with the springs 17 18, which connect with respective branches 20 21 of the circuit 1.

G represents a battery or other source of electric energy.

H represents a thermostatic switch, of any well-known or suitable construction, located in the apartment to be heated.

The apparatus is shown in a position assumed immediately after the thermostat H has been actuated by temperature above the normal, closing circuit through branch 21, spring 18, plate 13, strip 15, spring 16, and circuit 1, actuating the motor E by the energy from the battery G until the crank 2 has been rotated to the uppermost position shown, closing hot-air conduit A, and opening cold-air conduit B. When the apparatus has reached the above position, the contact-spring 16 has passed off from the strip 15 and onto the strip 14, breaking the circuit formed by the thermostat H. As soon as the temperature falls below the normal the thermostat H becomes reversed and closes circuit through branch 20, spring 17, plate 12, strip 14, and spring 16, and circuit 1 again actuating the motor E, the same rotating in the same direction as before, moving the crank 2 a further half-turn to its lowest position, closing the cold-air inlet B, and opening the hot-air inlet A.

An advantage afforded by the construction of device shown consists in that the crank 2 acts on the long radius of the arm 5 when rising, as indicated by the arrow 30 in Fig. 2, and lifting the weight of the valve D and connected parts, while in falling the said crank acts on the shorter radius of the arm 5 when passing the point indicated by the arrow 31 and while the weight of the descending parts assists the movement. The liability to stick is still further reduced thereby. The matter of mechanical power is of importance in operating valves of large size without requiring expensive or extremely accurate construction.

In Fig. 3 the operating device is applied to pivoted valves D' D², connected by rods 40 41 to the vibrating arm 5, the mode of operation being the same as hereinbefore described. The crank 2 in Fig. 3 acts on the long radius of the arm 5 in rising, as before, when it lifts the valves. In the instances of all the figures the valves are locked by the dead-center position of the crank 2 at its points of stoppage, and at the same time exact points of stoppage are unnecessary for the successful operation of the device.

Having thus fully described my invention, what I claim, and desire to secure by Letters Patent, is—

The combination with a valve having resistance of movement in one direction, of an electric motor for actuating said valve, a rotary crank operated by the motor and acting on a vibrating arm connected with said valve so that a long radius of the arm is engaged in moving the valve against its resistance and a short radius of the arm is engaged when the valve is moved in an opposite direction, an electric generator, a main circuit, a circuit-closer, and an electric switch operated by said motor and electrically connected with the motor-operating circuit whereby the said crank is arrested at a point intermediate to its range of travel on said vibrating arm.

Signed at New York, in the county of New York and State of New York, this 23d day of April, A. D. 1896.

SIDNEY GREEN.

Witnesses:
G. FAUVEL GOURAUD,
HENRY F. PARKER.